(Model.)
W. R. SPRAY.
BEE HIVE ATTACHMENT.
No. 325,988. Patented Sept. 8, 1885.
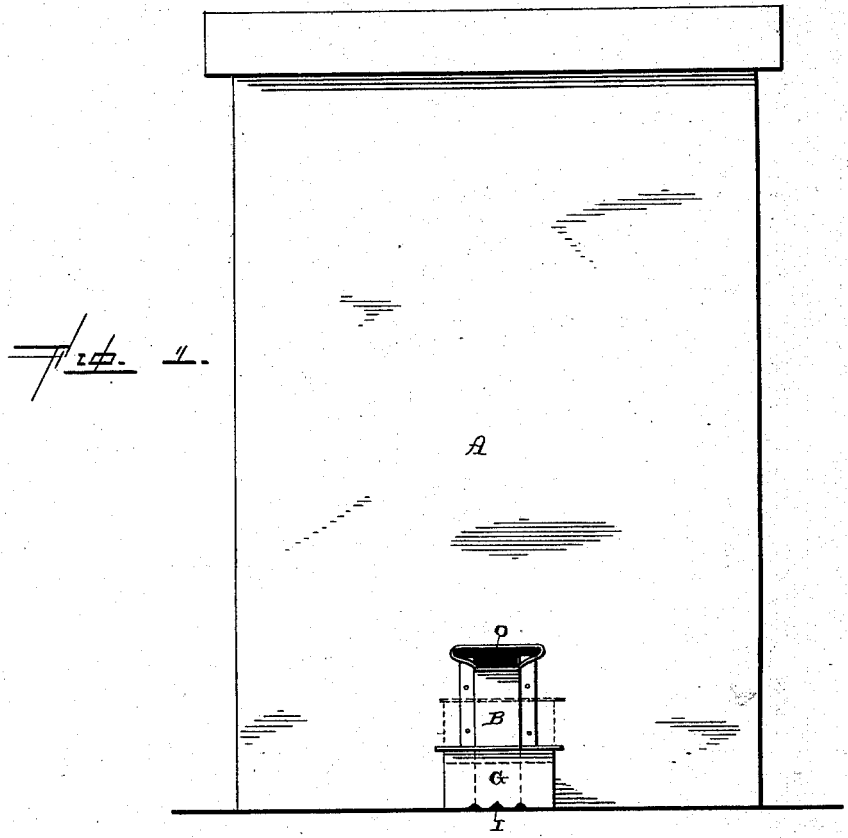
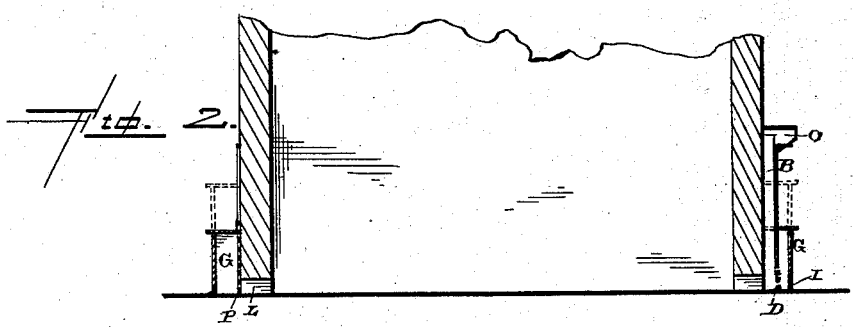
Witnesses.
L. F. Gardner
L. L. Burket.
Inventor.
W. R. Spray.
per J. A. Lehmann,
Atty.

United States Patent Office.

WILLIAM ROYALTY SPRAY, OF NEWTON, ILLINOIS, ASSIGNOR OF ONE-HALF TO J. W. HONEY, OF SAME PLACE.

BEE-HIVE ATTACHMENT.

SPECIFICATION forming part of Letters Patent No. 325,988, dated September 8, 1885.

Application filed July 15, 1885. (Model.)

*To all whom it may concern:*

Be it known that I, W. R. SPRAY, of Newton, in the county of Jasper and State of Illinois, have invented certain new and useful Improvements in Attachments for Bee-Hives; and I do hereby declare the following to be a a full, clear, and exact description of the invention, such as will enable others skilled in the art to which it pertains to make and use it, reference being had to the accompanying drawings, which form part of this specification.

My invention relates to an improvement in attachments for bee-hives; and it consists in a passage-way into the hive for the bees, and which extends a suitable distance up the side of the hive, and which has its lower end covered with wire-gauze, which extends down flush with the lower edge of the hive, with a chamber or covering, which is made vertically adjustable upon and removable from the passage-way, as will be more fully described hereinafter.

The object of my invention is to provide an attachment for bee-hives which will deceive the moths and millers, and cause them to lay their eggs in a chamber outside of the entrance, where they will be in no danger of being carried into the hive, and from which place they can be readily removed at any time.

Figure 1 is a front elevation of a device embodying my invention complete, showing the chamber raised upward in dotted lines. Fig. 2 is vertical section of the same.

A represents a hive of any suitable construction, and which has the passage-way or entrance B secured to its side. This passage-way will be made of sheet metal or any other suitable material that will answer the purpose, and which extends upward along the side of the hive any desired distance. The upper end of this passage-way is widened out, so as to form a cap, and made to extend outward over the entrance any desired distance. This cap serves as a protector for the entrance from rain, snow, or sleet, and also serves the purpose of misleading the millers and moths, which might be tempted to light at the entrance O to the hive.

The lower end of the passage B is formed of wire gauze or netting D, of any suitable description, which will allow the smell of the hive to pass freely through, and thus mislead the millers and induce them to enter the box G, which is adjustable upon and removable from the lower portion of the passage-way B. This box G has openings I, made through its lower edge, for the moths and millers to freely enter. These moths or millers, being deceived by the smell of the hive which passes through the wire-gauze, think that they are at the entrance of the hive, and will deposit their eggs in the box. This box when in position extends down flush with the lower edge of the hive; but when it is desired to clean out the eggs that have been laid therein it can be moved upward upon the edges of the passage-way B, as shown in dotted lines, so that the eggs can be swept away and destroyed. There may be any number of these boxes applied to the hive, although there may be only a single entrance.

The passage-way B will only be made where the entrance or entrances are; but there may be a number of these boxes used. In case there is to be only one passage-way to the hive there may be made an opening, L, in any of the other edges of the hive, and this edge covered over by suitable wire-gauze, P, through which the smell of the hive will freely pass. Over this wire-gauze P is placed a box, G, which has suitable cuts made in its lower edge, and through which the moths and millers enter. These boxes are also made vertically adjustable upon the wire-gauze or entirely removable therefrom, so that the eggs can be cleaned away at any time. As the bees do not enter the hive through this box, the eggs which are laid in them will never be carried into the hive by the bees.

Having thus described my invention, I claim—

1. The combination of the passage-way having its lower end formed of wire-gauze or perforated metal, with a box having suitable entrances for the millers and moths, and which is vertically adjustable upon the passage-way, substantially as shown.

2. The combination, with a bee-hive, of the passage-way B, having the cap or cover at its top and provided with the wire-gauze at its bottom, with a vertically-adjustable box, which is applied to the passage-way, and which is provided with entrances for the moths and millers, substantially as set forth.

In testimony whereof I affix my signature in presence of two witnesses.

WILLIAM ROYALTY SPRAY.

Witnesses:
J. S. HIZEY,
W. H. LATHROP.